United States Patent Office 3,372,049
Patented Mar. 5, 1968

3,372,049
POLYOLEFIN FILM COMPOSITION, FILM, AND PRESSURE-SENSITIVE ADHESIVE SHEET MATERIAL
Albert N. Schaffhausen, St. Paul, Minn., assignor to Minnesota Mining and Manufacturing Company, St. Paul, Minn., a corporation of Delaware
No Drawing. Filed Oct. 9, 1961, Ser. No. 143,546
6 Claims. (Cl. 117—7)

This invention relates to polymeric mono-alpha-olefinic compositions essentially containing isotactic polypropylene. Preferred embodiments of this invention are coated biaxially oriented films formed from the compositions, especially such films coated with normally tacky and pressure-sensitive adhesive.

Ethylene, the simplest mono-alpha-olefin, has been polymerized for the past several decades using the so-called "high pressure" process to form branched polyethylene. In recent years, mono-alpha-olefins have been polymerized under "low pressure" conditions employing as catalysts either a supported transition metal oxide or a transition metal halide with an organometallic compound of a metal from Groups I–III of the Periodic Table. Polyethylene made by this process is linear rather than branched, and has a greater density and higher melting point than conventional polyethylene. When the mono-alpha-olefin is a higher homologue of ethylene, polymerization by the "low pressure" method results in a substantial yield of "stereo-regulated" polymers, which are classified as either "isotactic" or "syndiotactic," as contrasted to the essentially random "unregulated" or "atactic" polymers formed by the "high pressure" method. The simplest isotactic homologue of linear polyethylene is isotactic polypropylene, in which each component monomer unit has the substituent methyl group and hydrogen atom arranged to project from asymmetric carbon atoms of the polymer chain in the same order or direction as the preceding units. (Atactic polypropylene has the methyl group and hydrogen atom arranged in random configuration.) In comparison with linear polyethylene, isotactic polypropylene has a lower density, a higher melting point, and a higher tensile strength. Its electrical characteristics, e.g., dielectric constant and power factor, are outstanding. This material is transparent, readily dyed or pigmented, and potentially has an extremely low cost.

It is well known that films of linear polyethylene and such stereo-regulated homologues as isotactic polypropylene can be molecularly oriented with a resultant increase in tensile strength and other physical properties. Prior to my invention, however, biaxial orientation has been extremely difficult to carry out. To illustrate, the tensile strength of extruded but otherwise unoriented isotactic polypropylene film is about 6,000 p.s.i., the tensile strength of compression molded films being somewhat lower. Although these films can be oriented to a tensile strength of perhaps 40,000 p.s.i. in one direction, any bidirectional orientation process is limited to the production of a low caliper film with a high percentage of wasted material because of the occurrence of "line orientation." In "line orientation" the film does not reduce evenly in caliper but is pulled down to its ultimate oriented thickness (on the order of one-half mil or less) along the edge of a thick section of substantially unoriented material. When this phenomenon occurs, it is difficult to obtain a useful quantity of uniform caliper film of any thickness, and it becomes almost impossible, practically, to prepare a biaxially oriented film having a thickness as great as, e.g., one mil. Stretching the film first in one direction and then in a second step in another direction results in film with non-uniform properties. Similar results are observed when film expanded as a tube is drawn in a longitudinal direction. Other processes have been described for simultaneously stretching sections of film in two mutually perpendicular directions, but either only a small amount of stretch can be achieved or the final product is a low caliper film, e.g., one-half mil.

Belgain Patent No. 572,425, suggests orienting isotactic polypropylene film by heating it above its melting point, cooling to a narrow temperature range slightly below the melting point, stretching, and thereafter cooling while maintaining the film under tension. Although this process can be made to work on a laboratory scale, the rapidity with which isotactic polypropylene crystallizes below its melting point makes control very difficult and hence the above described problems of stretching crystalline material are again encountered. I am aware of no technique prior to my invention which renders the production of uniform caliper biaxially oriented poly-alpha-olefin films, especially isotactic polypropylene films having a thickness as great as one mil, commercially feasible.

I have now devised a family of polymer blends based on isotactic polypropylene and capitalizing on its desirable features; when formed into a film, compositions made according to my invention can be readily biaxially oriented to obtain a tensile strength substantially greater than that of unoriented isotactic polypropylene at a uniform predetermined thickness as great as, e.g., one mil, with a minimum amount of waste and without the occurrence of significant line orientation. Biaxially oriented films formed from some of these compositions have stiff, low-stretch characteristics resembling those of cellophane but lacking the water sensitivity of that material; hence such films are admirably suited for the formation of water-resistant transparent tacky pressure-sensitive adhesive tapes. Films formed from other of these polypropylene-based compositions are strong but flexible and capable of being elongated at least about 50%; films of this type are especially suited for wrapping snugly about irregularly shaped electrical conductors. Still other uses for products embodying my invention will become apparent as the description proceeds.

In accordance with my invention, crystalline isotactic polypropylene is modified by blending with it substantial quantities of one or more other polyalphaolefins of crystallinity ranging from 0% to about 90%. As indicated in the preceding paragraph, the exact amount or type of the other polyolefin employed varies with the end use, but generally should be in the range of about 1 to 9 parts for every 3 parts of isotactic polypropylene. A preferred ratio of polypropylene to polyolefin modifier lies between 3:1 and 1:1. Isotactic polypropylene is incompatible with almost all other poly-alpha-olefins; in fact, infrared analysis indicates that the crystallinity of the polypropylene in such blends is essentially the same as the crystallinity in unmodified isotactic polypropylene. That such polymer blends should prove to be orientable without line orientation is especially surprising in view of the fact that other linear or stereo-regulated poly-alpha-olefins are subject to the same problems of line orientation as isotactic polypropylene.

The following examples will serve to illustrate the nature of my invention, but are not intended to be limiting in any way.

EXAMPLE I

Two parts by weight of "Pro-fax" No. 6511 polypropylene molding powder (an isotactic material having a density of 0.90 g./cm.$^3$ a melting point of 340° F., having an average molecular weight of at least 250,000, and a crystallinity of about 65%, sold by the Hercules Powder Company) were blended with one part of "Super Dylan" No. 6004 polyethylene molding powder (a linear material having a density of 0.953 g./cm.$^3$ a melting point of 270° F., and a crystallinity of about 90%, sold by the Koppers Company) on a two roll rubber mill at 380° F. until a smooth band was formed from the components. Although commercial linear poly-alpha-olefins contain an anti-oxidant, it may be desirable, although not essential, to add 0.05 to 0.50 part of an additional anti-oxidant (such as 4,4′-thiobis(3-methyl-6 tertiary butyl phenol), sold as "Santonox" by the Monsanto Chemical Company) per 100 parts of polyolefin. From 0.10 to 1.00% (based on the polyolefin) of any conventional lubricant, e.g., calcium stearate, wax, or silicone oil, may also be incorporated in the blend if desired. Small amounts of pigments may also be added if colored films are desired.

The polymer blend was then extruded to form a sheet having a thickness of 30 mils, a tensile strength of approximately 4,400 p.s.i. in the machine direction and 3,300 p.s.i. in the transverse direction, and an ultimate elongation of more than 800%. The melting point of the sheet material was 320° F. Sheet or film stock can also be prepared by calendering, compression molding or casting the blend from solution. A 2″ x 2″ sample was cut from this sheet and gripped at all four sides by a small film stretching device. The entire assembly, contained in an oven with hot circulating air, was heated to about 300° F. and allowed to reach equilibrium. Opposite sides of the clamped film were then simultaneously moved apart in two mutually perpendicular directions at a constant rate of 600% per minute until the area of the film being biaxially stretched was increased on the order of 20-fold, i.e., until the dimensions of the film were approximately 9″ x 9″. The stretched film was then rapidly cooled to room temperature while being held under tension, after which the thickness was found to be approximately 1.4 mils. By way of contrast, a 30 mil sheet of unmodified isotactic polypropylene stretched under identical conditions yields film ranging from 0.8-0.9 mil in thickness at the oriented areas to almost its original thickness at the lines along which the orientation occurs. The tensile strength of the oriented film of this example was 19,200 p.s.i. in both directions, the total elongation at break being approximately 72%. The film was essentially uniform in thickness and had a degree of line orientation which may be classified as 2, on a scale where 5 represents the severe line orientation achieved with unmodified isotactic polypropylene under identical conditions and 0 represents what may be termed "area orientation," or the complete lack of line orientation. The film was transparent but somewhat hazy and had general physical characteristics which rendered it extremely suitable for use as a backing for transparent pressure-sensitive adhesive tape for household use.

For a given stretch ratio, the attainable tensile strength of a blend is directly proportional to the percentage of isotactic polypropylene present. As the amount of polypropylene is increased, however, line orientation also increases, and blends having a polypropylene:modifier ratio much in excess of 3:1 are subject to line orientation nearly as severe as that obtained with unmodified isotactic polypropylene. The composition of Example I represents the best compromise of high tensile strength and low line orientation characteristics for most purposes.

EXAMPLE II

A 1:2 polypropylene:linear polyethylene blend was prepared as in Example I. A sheet 20 mils in thickness was biaxially stretched simultaneously in two mutually perpendicular directions at a uniform stretch ratio of 4.45 to 1 in both directions at a temperature of 270° F. The resulting film was 0.8 mil thick with a tensile strength of 8,000 p.s.i. and ultimate elongation of 20%. Line orientation was even less apparent than in Example I, being rated 1 on the scale referred to therein. In this case both the tensile strength and elongation have been reduced so that a pressure-sensitive adhesive tape employing this film as the backing tears more readily, making it useful as a general packaging tape. As the ratio of polypropylene to linear polyethylene is further lowered in a blend, e.g., below 1:3, the blend becomes increasingly more difficult to biaxially orient. As is known in the art, linear polyethylene alone is virtually impossible to simultaneously orient in two directions.

EXAMPLE III

A 1:1 polypropylene:linear polyethylene blend was prepared and stretched as described in Example I. At an orientation temperature of 310° F. a 21 mil sheet was reduced in caliper to 0.95 mil. No line orientation was apparent. The resulting tensile strength of the film and the elongation at break were 12,000 p.s.i. and 50% respectively. Although the composition of this example orients uniformly, mechanical strength and thermal stability are both somewhat lower than for the composition of Example I.

Poly-alpha-olefins with little or no crystallinity can also be used to modify isotactic polypropylene, as the following example illustrates.

EXAMPLE IV

A 1:1 blend of "Pro-fax" isotactic polypropylene and atactic polypropylene (having a density of 0.86, a melting point of 190° F., a tensile strength of 400 p.s.i. at an elongation of 1,300%, and a crystallinity approaching 0%) was prepared and simultaneously biaxially stretched as described in Example I. A 21 mil section produced a highly transparent 0.7 mil film when stretched at 295° F. with an area increase of approximately 20 fold. The ultimate tensile strength of the oriented film was 10,800 p.s.i. in both directions at an elongation of 65%. Atactic polypropylene does not reduce the phenomenon of line orientation until substantial quantities are added, e.g., as herein, 50%. The addition of further quantities of atactic polypropylene, however, serves only to reduce the strength and melting point of the ultimate product. The strength of film made from blends incorporating this additive is generally lower than that of film made from blends incorporating the more highly crystalline additives of previous examples. The clarity of the film of this example, however, is superior to the films of preceding examples, rendering it useful as a water-resistant replacement for the cellophane backing of transparent pressure-sensitive adhesive tape.

EXAMPLE V

A blend of one part of isotactic polypropylene and one part of crystalline isotactic polybutene, was prepared as described in Example I. The polybutene, prepared from butene-1, using a Ziegler type catalyst, had a density of 0.90 gms. per cc., a melting point of 246° F., and a tensile strength of 3,200 p.s.i. Sheet stock 21 mils in thickness was simultaneously biaxially oriented at 290° F. at a stretch ratio of 4.49 to 1 in each direction to give a uniform 1.4 mil film having a tensile strength and ultimate elongation in both directions of 10,000 p.s.i. and 136% respectively. Line orientation of the blend was negligible, even though sheets of isotactic polybutene alone could not be biaxially oriented simultaneously without either tearing or melting from too low or too high orientation temperatures, respectively. The oriented film of this example was somewhat more soft and flexible than the blend of Example III, and had substantially the same strength and ultimate elongation as the oriented film of Example IV. Isotactic polybutene-modified film is useful in tapes where substantial stretchiness is desired, e.g., those used in electrical installations. Film made from polybutene-modified isotactic polypropylene, however, has lower heat resistance than film made from isotactic polypropylene modified with linear polyethylene. The advantages of the two modifiers may be utilized by blending both linear polyethylene and isotactic polybutene with isotactic polypropylene in the same composition, to produce a heatresistant high-elongation film. Atactic polybutene-modified isotactic polypropylene has still lower heat resistance and tensile strength than the product of this Example V.

EXAMPLE VI

A 2:1 blend composition of isotactic polypropylene and branched type polyethylene (Bakelite "DYNH," having a density of 0.92, tensile strength of 1,800 p.s.i., melting point of 230° F., and crystallinity of about 65%, sold by the Union Carbide Plastics Co.) was compounded with processing aids as described in Example I. Sheet stock of this composition 20 mils in thickness was simultaneously biaxially oriented with a draw ratio of 4.45 to 1 at 280° F. to give film 1.1 mils in thickness and having tensile strength and ultimate elongation of 14,800 p.s.i. and 68% respectively. Uniformly high caliper biaxially oriented film can be obtained when branched polyethylene is used as a modifier, but heat resistance and tensile strength are both lower than when linear polyethylene is similarly employed, as in Example I. A 3-component 2:0.5:0.5 isotactic polypropylene:linear polyethylene:branched polyethylene blend produced a sheet which when biaxially oriented at 265° F. exhibited only slight line orientation, i.e., 1 on the scale referred to in Example I. Essentially balanced film 1.1 mils in thickness was obtained from 21.6 mil sheet stock when a draw ratio of 4.45 to 1 was used. The film had a tensile strength of 16,700 p.s.i. and ultimate elongation of 66%.

EXAMPLE VII

Two parts of isotactic polypropylene were blended with 1 part of polyhexene-1, the latter containing approximately equal amounts of isotactic and atactic polymer. Biaxially orienting at 305° F. with a draw ratio of 4.45 to 1 in two directions, a 26 mil sheet of the above blend was reduced in caliper to 1.2 mils with a resulting tensile strength of 20,200 p.s.i. at 88% ultimate elongation. Even though polyhexene is considerably softer than either polyethylene or polybutene, the excellent high temperature properties of polypropylene were not degraded to any appreciable amount. The increased stretchiness and flexibility give a film which is useful for electrical tapes, although the comparatively high solubility of polyhexene in oragnic solvents limits its utility where resinous coatings are to be applied to taped electrical components. Greater elasticity can be imparted to the film by employing lower stretch ratios. Even softer polymers of the poly-alpha-olefin series, such as polyoctene can be employed advantageously in a 3-component system, as indicated in Example VI.

EXAMPLE VIII

A 2:1 blend of isotactic polypropylene and a rubbery ethylene:propylene copolymer ("EPR-60," having a density of 0.85, an average molecular weight of 180,000, and a crystallinity of less than 5%, obtained from the AviSun Corp.) was prepared as described in Example I. Sheet stock of this composition, 20 mils in thickness, was simultaneously stretched in two directions with a draw ratio of 4.45 to 1 in each direction at a temperature of 295° F. The resulting biaxially oriented film was 0.85 mils thick, having a uniform tensile strength of 7,900 p.s.i. at 110% ultimate elongation. Line orientation was rated 3 on the scale described in Example I. The film, however, was somewhat less clear than films of the preceding examples. The ethylene-propylene copolymer itself has a very low degree of crystallinity as determined by X-ray diffraction methods, and its physical characteristics could not be noticeably improved by orientation. When subjected to stretching forces, the crystalline regions of the copolymer become oriented without inducing any further crystallinity, the amorphous regions remaining unoriented. Other hydrocarbon copolymers, e.g., a 20% crystalline 1:1 copolymer of propylene and butene-1, can also be employed as modifiers for crystalline polypropylene in the practice of this invention.

EXAMPLE IX

The following composition was prepared as in Example I:

| | Parts |
|---|---|
| "Pro-fax" polypropylene | 100 |
| "Super-Dylan" polyethylene | 50 |
| Dow Corning Silicone Gum #401 | 1 |
| Calcium stearate | 0.25 |
| "Santonox" anti-oxidant | 0.50 |

A 26 mil sheet of the above blend was simultaneously biaxially oriented at 300° F., with the same draw ratio of 4.45 to 1 in both directions; then air-quenched rapidly to a temperature slightly above room temperature before the film was released from tension. Film mechanical properties were 18,000-19,000 p.s.i. in both directions with 100% elongation at break. The crystallinity of the oriented blend film was 80% as determined by infra-red analysis. This film was coated with an acrylate adhesive, consisting of a ethyl acetate solution of a 90:10 copolymer of commercial fusel oil acrylate and acrylic acid in an ethyl acetate solvent, as disclosed in Ulrich U.S. Reissue Patent No. 24,906, to provide a transparent pressure-sensitive adhesive tape suitable for many consumer and industrial applications. Conventional rubber-resin pressure-sensitive adhesives may also be coated on these films to make useful tapes. Bonding between adhesive and film may be improved by first subjecting the film to a corona discharge, e.g., by passing it at a rate of 30 feet per minute between copper electrodes spaced 0.5 inch apart, 350 volts A.C. being impressed across the electrodes at a current density of 8 amperes per square foot while maintaining a vacuum of 0.5 millimeter of mercury. Adhesion may also be improved by flame treatment, surface abrasion, or surface oxidation with strong inorganic oxidizing agents.

EXAMPLE X

Tape backing for certain applications is best provided by an unbalanced film, i.e., one having unequal properties in machine and transverse directions. A blend similar to that described in Example I was extruded as flat sheet material, 14 mils in thickness. The film was first longitudinally, and then laterally, oriented, at 300° F., with draw ratios of 3.5 to 1 and 5.8 to 1 in the machine and transverse directions, respectively, at 300° F. The resulting film was 0.7 mil thick and had the following properties:

| | Machine direction |
|---|---|
| Tensile strength (p.s.i.) | 10,200 |
| Elongation at break (1%) | 200 |
| Elastic modulus (p.s.i.) | 144,000 |

| | Transverse direction |
|---|---|
| Tensile strength (p.s.i.) | 29,400 |
| Elongation at break (1%) | 46 |
| Elastic modulus (p.s.i.) | 248,000 |

This film was treated by subjecting it to corona discharge and then coated with a 95:5 copolymer of isooctyl acrylate and acrylic acid in ethyl acetate solvent. Upon evaporation of the solvent, the resulting tacky and pressure-sensitive adhesive tape had high strength and greater longitudinal stretchiness and elasticity than the tape of Example IX. This tape is useful where especially great conformability, even greater than that of the films of Examples V and VI, is required. Tape having a greater crosswise than lengthwise strength also resists splitting and is easy to tear to the desired length.

Numerous variations in composition, processing, and application will readily occur to those skilled in the art. Accordingly, I do not intend to be limited other than by the scope of the appended claims.

What I claim is:

1. A poly-mono-alpha-olefinic composition which can be formed into a sheet capable of biaxial orientation to a uniform thickness of at least about 1 mil and to a tensile strength of substantially more than 6,000 p.s.i. in mutually perpendicular directions, comprising a uniform physical blend, solid at room temperature, of polymers consisting essentially of from about 50% to about 75% predominantly crystalline isotactic polypropylene having an average molecular weight of at least 250,000 and correspondingly from about 50% to about 25% of at least one separately prepared predominantly crystalline poly-mono-alpha-olefinic homopolymer other than polypropylene.

2. A strong biaxially oriented film of substantially uniform thickness and formed from the composition of claim 1.

3. Pressure-sensitive adhesive sheet material comprising a layer of normally tacky and pressure-sensitive adhesive firmly united to the film of claim 2.

4. A uniform physical blend consisting essentially of approximately 2 parts of predominantly crystalline isotactic polypropylene having an average molecular weight of at least 250,000 and 1 part of linear polyethylene, said blend being characterized, upon formation into a film and subsequent biaxial orientation, by stiffness comparable to that of cellophane, high tensile strength, uniform thickness, and transparency.

5. A strong biaxially oriented uniform transparent film having stiffness and stretch characteristics comparable to those of cellophane, said film having been formed from a uniform physical blend consisting essentially of approximately 2 parts of predominantly crystalline isotactic polypropylene having an average molecular weight of at least 250,000 and 1 part of linear polyethylene.

6. Pressure-sensitive adhesive sheet material comprising a layer of normally tacky and pressure-sensitive adhesive firmly united to the film of claim 5.

References Cited

UNITED STATES PATENTS

| | | | |
|---|---|---|---|
| 2,631,954 | 3/1953 | Bright | 117—122 |
| 2,825,721 | 3/1958 | Hogan et al. | 117—138.8 |
| 3,013,003 | 12/1961 | Maragliano et al. | |
| 3,079,272 | 2/1963 | Naudain | 117—122 |
| 3,086,958 | 4/1963 | Canterion et al. | 260—297 |
| 3,088,848 | 5/1963 | Tritsch | 117—122 |
| 3,112,300 | 11/1963 | Natta et al. | 266—897 XR |
| 3,144,430 | 8/1964 | Schaffhausen | 117—122 XR |
| 3,146,284 | 8/1964 | Markwood | 264—289 XR |
| 2,931,740 | 4/1960 | Riboni | 117—121 X |
| 3,036,087 | 5/1962 | Ranalli | 260—45.5 |
| 3,265,771 | 8/1966 | Ray et al. | 260—897 |
| 3,281,501 | 10/1966 | Coats et al. | 260—897 |

FOREIGN PATENTS

| | | |
|---|---|---|
| 217,125 | 2/1950 | Great Britain. |
| 871,183 | 6/1961 | Great Britain. |
| 549,915 | 8/1955 | Italy. |
| 594,971 | 6/1959 | Italy. |

OTHER REFERENCES

British Plastics, vol. 34, June 1961, pages 312–318 and July 1961, pages 391–394.

Gaylord, Norman G. and Mark, Herman F.: "Livear and Stereoregular Addition Polymers," Interscience Publishers, Inc., New York (1959), pages 50–55.

WILLIAM D. MARTIN, *Primary Examiner.*

W. D. HERRICK, *Assistant Examiner.*